(No Model.)
C. H. DORENWEND.
ELECTRIC BELT.
No. 459,681. Patented Sept. 15, 1891.
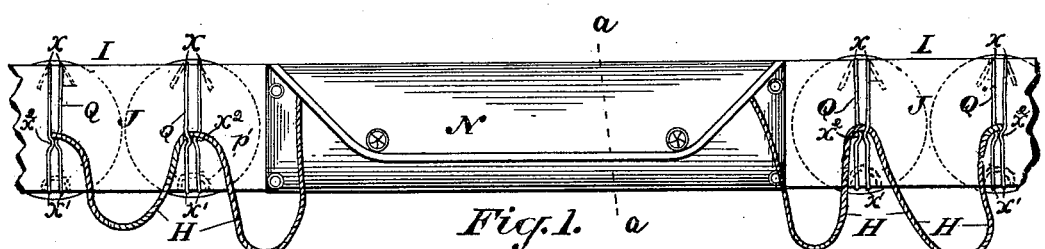
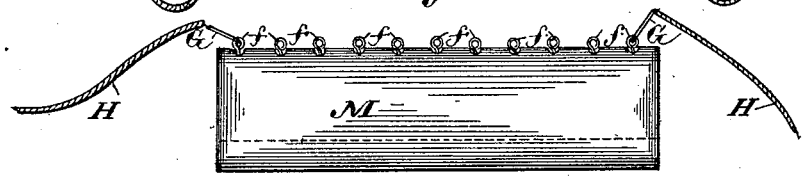
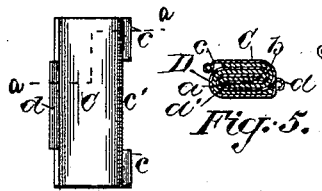
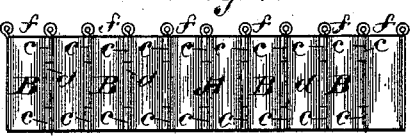
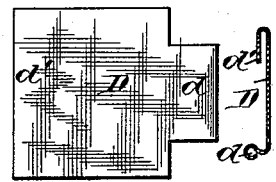
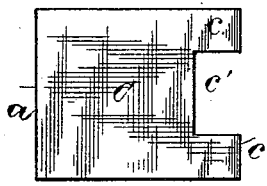
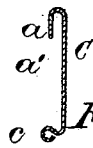
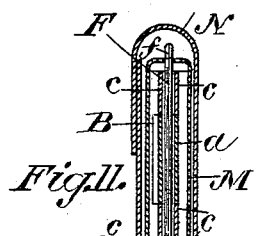
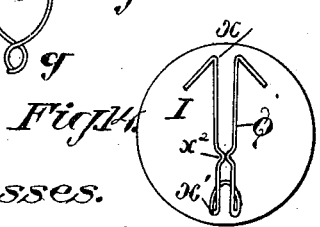
Witnesses.
Chas. Meek
Geo. E. Lucas
Inventor:
Christian H. Dorenwend
by Charles H. Riches
Attorney.

UNITED STATES PATENT OFFICE.

CHRISTIAN HILDEBERT DORENWEND, OF TORONTO, CANADA.

ELECTRIC BELT.

SPECIFICATION forming part of Letters Patent No. 459,681, dated September 15, 1891.

Application filed September 16, 1890. Serial No. 365,126. (No model.)

*To all whom it may concern:*

Be it known that I, CHRISTIAN HILDEBERT DORENWEND, electrician, of the city of Toronto, in the county of York, in the Province of Ontario, have invented certain new and useful Improvements in Electric Belts; and I hereby declare the following to be a full, clear, and exact description of the same.

The object of this invention is to devise a body-battery for galvanic belts and other appliances which will have a large generating area and at the same time occupy but a small compass; and it consists, essentially, of the device hereinafter more particularly explained.

Figure 1 is a view showing my mode of carrying the body-battery in a pouch connected to a belt and connecting the circuit-wires to the electrodes and cells. Fig. 2 is a view showing the battery inclosed in an inner wrapper. Fig. 3 is a view of a battery of ten cells. Fig. 4 is an enlarged view of one of the cells. Fig. 5 is a cross-section on the line $a\,a$, Fig. 4. Fig. 6 shows a view of the zinc plate as it leaves the die. Fig. 7 shows a view of the zinc plate ready to be connected to the copper plate. Fig. 8 shows a view of the copper plate as it leaves the die. Fig. 9 shows a view of the copper plate ready to be connected to the zinc plate. Fig. 10 is a view showing the first position of the copper and zinc plates and the fabric filament in the act of being folded. Fig. 11 is a cross-section on the line $a\,a$, Fig. 1. Fig. 12 shows an enlarged view of my improved spring-hook. Fig. 13 shows a view of my electrode and hook. Fig. 14 shows a view of my improved means of securing the electrode to the belt. Fig. 15 is a side elevation of Fig. 14.

Like letters of reference refer to like parts throughout the specification and drawings.

My improved body-battery, as shown in the drawings, consists of ten generating-cells B. Each of these cells B is preferably composed of a copper plate C and a zinc plate D, with a fabric filament $b$ between them charged with actuating solution.

As the principal part of my invention consists in the formation of these cells, I shall proceed to minutely describe their construction.

The copper plate C is cut out in the form of a rectangle having two lugs $c\,c$ extending outwardly from one of its ends, with a space $c'$ between them, as shown in Fig. 8. These lugs $c\,c$ are then bent to form female hinges or sockets for a hinge-pin, which will be hereinafter described. After bending the lugs to form female hinges or sockets, they are turned at right angles to the body of the plate C, as shown in Fig. 9, while the opposite end $a$ is folded back upon the body, but leaving a space $a'$ between itself and the body of the plate C, as shown in the same figure.

The zinc plate D is cut out in size and shape similar to that of the copper plate C, and has an outwardly-projecting lug $d$ of the same length as the lugs $c\,c$ and the same width as the space $c'$. This lug $d$ is bent to form a hinge or socket to correspond with the female hinges or sockets $c\,c$, while the opposite end $d'$ is folded to correspond with the folded end $a$ of the plate C.

In putting the zinc and copper plates together the folded portions of each plate are placed one inside the other, with the fabric filament $b$ between them, as shown in Fig. 10, and then wrapped one around the other until they assume the form shown in Fig. 4; also, by reference to Fig. 5 it will be noticed that a double fold is made in each of the zinc and copper plates, by means of which the possibility of separation of the said plates is entirely avoided, while if only a single fold were used it would be a very easy matter to draw one plate from the other. It will be further seen that the double fold not only, as above set forth, avoids the possibility of separation, but also offers a larger surface of metal in each plate to the exciting-fluid. This gives the advantage of being enabled to obtain a large quantity of current from a cell occupying but a small compass. It will thus be readily seen that a cell composed of a double fold of each of the plates will give at least a current of double quantity to that given by a cell consisting only of a single fold.

In putting the cells B together to form a battery the hinge $d$ is placed in the space $c'$ between the female hinges $c\,c$, and a hinge-pin F, having an eye $f$ formed on one end, is passed through the female and male hinges, coupling the cells B together. By this form of construction of cell a large surface of metals is brought into action in a small compass.

Hooks G, made of a single wire, preferably of German silver bent into the form of a triple eye and having spring-jaws $g$, are attached to the ends of the conductor-cords H and connect the conductor-cords H to the eyes $f$ of the hinge-pins F.

The electrodes I, formed of circular plates of suitable substance incased in a covering of chamois or other suitable material to prevent the metal burning the flesh, are placed at intervals along the inner side of the belt J and are connected to the said belt J by means of clips Q, hereinafter referred to. The battery A, before being placed in the pouch, is enrolled in leather wrapper M, having eyelets, through which pass the eyes $f$ of the hinge-pins F. The pouch N, into which the battery is now placed, is fastened to clips which are connected to the belt J.

The force of the current of electricity of each battery can be regulated by connecting the conductor-cords H either nearer or farther from each other, according as the current is required to be weaker or stronger, and by using a spring-hook G, such as is shown and described in the drawings and specification, the conductor-cords H can be easily and rapidly connected to or disconnected from the eyes of the hinge-pins F. By providing the electrodes I and the pouch N with clips it is possible to adjust them to any desired point without having to remove the belt from the body. By placing bands provided with electrodes around other parts of the body, and connecting these electrodes with the body-battery by suitable conductor-cords, an electric shock can be given at any point.

In Fig. 13 I have shown an improved means for securing the electrodes within the chamois hood O, which consists in providing said electrodes at the top and bottom with eyes $s'$ $s'$, through which pass the hooked ends $r\ r$ of the clasp S. To cause the hooks $r\ r$ to remain in place, the clasp S is coiled at its middle into a spring $s$. The hood O of chamois, having a tightening-string $o$ passing through the openings $o'$, incloses the electrodes I. The means for securing the electrode I to the belt J consists of a clasp Q, having its upper ends $x$ bent downwardly to form acute angles and secured to the electrode, its lower ends $x'$ formed into a loop unconnected with the electrode, and provided intermediate the two ends with inwardly-extending meeting bends $x^2$, which form a means for attachment of the conducting-cords.

Having thus fully described my invention, what I claim as new, and desire to secure by Letters Patent, is—

1. In an electric belt, the combination, with an electrode provided upon its outer side, at diametrically-opposite points, with eyes, of a chamois covering for said electrode, provided with slits or openings for the reception of said eyes, a tightening-string passing through suitable slits therefor in said cover, and a clasp having a central coil and hooked ends engaging the eyes of the electrode, substantially as set forth.

2. In an electric belt, the combination, with an electrode, of a clasp having its upper ends bent downwardly to form obtuse angles, said ends being connected to the electrode, its lower end formed with a loop unconnected with the electrode, and provided intermediate said ends with inwardly-extending meeting bends to form a means for attachment of the conducting-cords, substantially as set forth.

Toronto, September 4, 1890.

CHRISTIAN HILDEBERT DORENWEND.

In presence of—
   GUSTAVE A. PRIEST,
   CHAS. E. RIORDAN.